United States Patent Office 2,746,731
Patented May 22, 1956

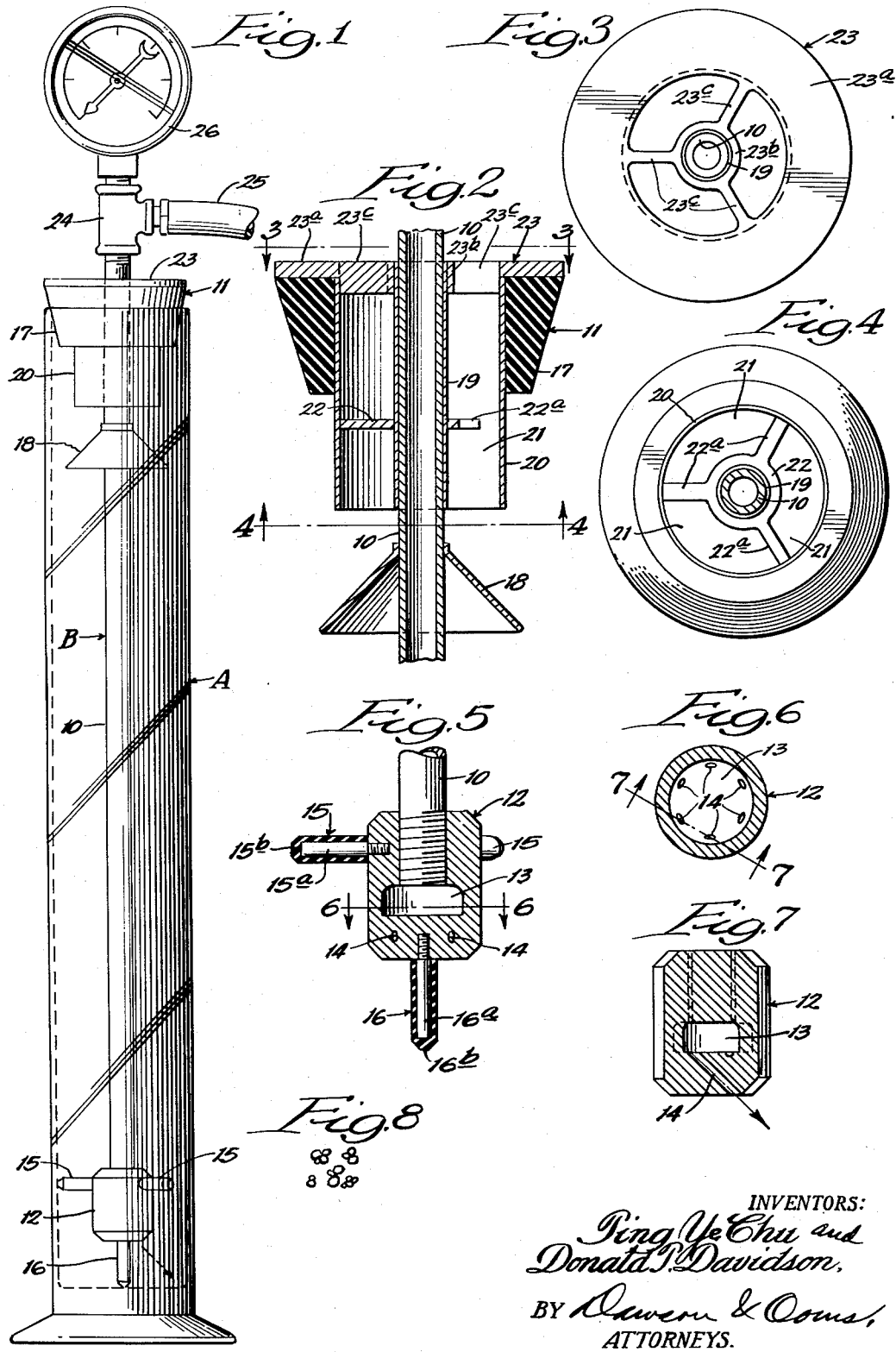

2,746,731

SOIL DISPERSION APPARATUS

Ting Ye Chu and Donald T. Davidson, Ames, Iowa, assignors to Iowa State College Research Foundation, Inc., Ames, Iowa, a corporation of Iowa Application August 25, 1952, Serial No. 306,134

6 Claims. (Cl. 259—99)

This invention relates to a soil dispersion apparatus, and more particularly to a soil dispersion apparatus for use in the mechanical analysis of soils.

Mechanical analysis to determine particle size distribution of different types of soil materials is a common test used in civil engineering, ceramic engineering, geology, and agricultural soil laboratories. An essential step in the mechanical analysis is to disperse a soil sample into individual particles suspended in water. This procedure has particular utility for a fine particle soil fraction which contains particles down to colloidal size, and therefore cannot be accurately analyzed by sieving methods. For example, a soil sample may be divided with a 200 mesh sieve, and the fraction retained further analyzed by sieving, while the fraction passing is dispersed in water for analysis by a hydrometer method. In hydrometer methods of soil analysis, a hydrometer is used to determine the percentage by weight of a sample of soil remaining in suspension in water after any given period of sedimentation. Since the velocity of sedimentation of soil particles of different size varies in accordance with Stoke's Law, it is possible to compute the maximum particle size in suspension at the time any hydrometer reading is made. A series of such readings makes possible the determination of the gradation of a fine particle fraction of soil.

One of the major problems connected with the hydrometer method of soil analysis is that of obtaining a complete dispersion of the soil sample in water without appreciable degradation of the particles. The object of dispersing the soil sample in water is to break up agglomerates or clusters of soil particles into the separate particles of which they are composed. If this is not accomplished, the hydrometer analysis is not representative of the actual particle gradation of the soil being tested. However, the individual particles are subject to being worn down or broken up during the dispersion, and this size degradation also distorts the analysis.

For many years the standard practice has been to use a high speed mechanical stirring device similar to an electric milk-shake mixer. This practice is presently approved by the American Society for Testing Materials and the American Association of State Highway Officials. Originally, the A. A. S. H. O. prescribed a minimum stirring time of 15 minutes with a high speed mechanical stirring device, but this was found to lead to excessive degradation. Therefore this specification was changed to a mixing time of one minute. However, it has been found that a time of one minute is insufficient to give complete dispersion with many types of soil, especially the more cohesive soils containing a relatively large clay fraction. Therefore, there has long been a need for a better soil dispersion apparatus.

The use of compressed air to stir the soil and water mixture in making the dispersion has been suggested but no simple, inexpensive, and easily operated apparatus has heretofore been developed. Moreover the design of a soil dispersion apparatus employing compressed air presents a number of technical problems which have not been satisfactorily solved prior to the present invention.

Other types of equipment such as "end-to-end shakers" have also been suggested, but this type of equipment is impractical because an excessive amount of time is required to complete the dispersion.

All soil dispersion apparatus heretofore employed suffer from the further disadvantage of requiring the soil sample to be handled excessively in preparing it for the hydrometer test. The procedure has been to first place the dry soil sample in a beaker to which water is added, and the sample is soaked in the water for at least one hour. The soaked soil sample is next transferred to a dispersion vessel, such as the cup of an electric mixer. Additional water is usually added at this point together with a dispersing agent, and the mixture is then dispersed. Following the dispersion, the sample is transferred to a hydrometer jar for the conducting of the hydrometer test. It can readily be seen that this sequence of steps, requiring a number of transfers of the material, is relatively laborious and time consuming.

It is therefore a general object of this invention to provide a soil dispersion apparatus which substantially overcomes all of the problems discussed above. In this connection it is a general object to provide an apparatus which is capable of effecting the complete dispersion of a soil sample in a minimum of time without appreciable degradation. A more specific object is to develop a soil dispersion apparatus which employs compressed air as a stirring means, while at the same time being economical in construction and easily operated. In this connection it is a specific object of this invention to provide an apparatus which permits the whole process of soil dispersion and hydrometer testing to be carried out in a standard hydrometer jar, thus greatly simplifying the procedure for preparing a soil sample for hydrometer testing. Further objects and advantages will appear as the specification proceeds.

A preferred embodiment of an apparatus constructed in accordance with the principles of this invention is illustrated in the accompanying drawing, in which—

Figure 1 is an elevational view of a complete soil dispersion apparatus including the soil dispersion tube and hydrometer jar with which it is preferably employed; Fig. 2, a fragmentary vertical sectional view of the soil dispersion tube of Fig. 1 showing the construction of the stopper assembly and its relationship to the deflector therebelow; Fig. 3, a sectional plan view of the stopper assembly taken on line 3—3 of Fig. 2; Fig. 4, a sectional bottom view of the stopper assembly taken on line 4—4 of Fig. 2; Fig. 5, a fragmentary vertical sectional view of the jet head and associated parts of the soil dispersion tube of Fig. 1; Fig. 6, a sectional plan view of the jet head taken on line 6—6 of Fig. 5 showing the upper ends of the jet passages; Fig. 7, a fragmentary vertical sectional view of the jet head taken on line 7—7 of Fig. 6 showing the orientation of the jet passages with respect to the jet head; and Fig. 8, an enlarged view of typical soil aggregates as they might appear prior to dispersion during which they are broken up into individual particles.

Looking first primarily at Fig. 1 there is shown a soil dispersion apparatus consisting of a hydrometer jar A and a soil dispersion tube B. Any suitable type of hydrometer jar can be employed. In the illustration given hydrometer jar A is shown as an open-topped vertically-extending glass graduate, which preferably holds at least 1 liter, since this is the type of vessel usually employed in hydrometer testing of soil samples. The soil dispersion tube B includes as principal elements thereof a conduit 10 for supplying compressed air or other suitable compressed gas to the lower part of the hydrometer jar, and a stopper assembly 11 adapted to provide a closure for the top of the hydrometer jar while at the same time supporting conduit 10 within the jar. The air dispersion tube will now be described in detail.

The lower end of tube 10 preferably extends within jar A to a point well below the surface of the soil and water mixture which is to be dispersed. It is desired to provide the lower end portion of conduit 10 with at least one passage communicating with the exterior of the conduit and arranged to direct a jet of air outwardly from the conduit, thereby exerting a stirring and dispersing action on the mixture surrounding the lower end of tube 10. It has been found that this can be most advantageously accomplished by connecting a hollow jet head 12 to the lower end of conduit 10. In the illustration given as shown more clearly in Fig. 5 the lower end portion of conduit 10 threadedly engages a vertical passage within head 12 and communicates with an enlarged chamber 13. Jet head 12 is provided with a plurality of downwardly and outwardly oriented passages 14 disposed in spaced relation about the head and communicating at their inner ends with chamber 13. Preferably passages 14 extend from the floor of chamber 13 in crisscross relation so that each passage can be oriented downwardly and outwardly with the passage exits being arranged in a generally circular or ring-like formation, thereby creating a downwardly diverging funnel-shaped pattern of air jets for dispersing the soil within the water. In the illustration given passages 14 are inclined at about a 45° angle and direct the jets issuing therefrom along similarly inclined lines, as indicated by the arrows in Figs. 1 and 7.

To achieve the maximum dispersing action with a minimum of particle degradation, it has been found desirable to provide means for maintaining the jet head in a substantially fixed relationship with respect to the bottom and side walls of the hydrometer jar. This is preferably accomplished by providing jet head 12 with a plurality of laterally-extending arms 15 and at least one downwardly-extending arm 16. In the illustration given as shown more clearly in Fig. 5 arms 15 and 16 consist of metal pins 15a and 16a which are threadedly affixed to jet head 12, and rubber protecting sheaths 15b and 16b received on pins 15a and 16a. The purpose of sheaths 15b and 16b is to prevent the arms from scratching the sides and bottom of the hydrometer jar, and also to permit the arms to assist in the dispersing operation without tending to promote degradation. Sheaths 15b and 16b can also be advantageously employed to adjust the dispersion apparatus to hydrometer jars of slightly different inside diameter. In the illustration given three laterally-extending arms 15 are employed and extend horizontally from the upper portion of head 12 at a space of approximately 120° apart.

In the operation of the apparatus it is necessary to provide a closure for the upper end of the hydrometer jar which permits the free escape of the air liberated within the jar, while at the same time retarding and preferably completely preventing the ejection of soil and water. It has been found that this can be accomplished by means of a stopper 17 disposed about the upper end portion of conduit 10 providing at least one passage therethrough for the escape of air, and having a deflector or shield 18 associated therewith and arranged to retard the movement of liquid and solid material through the stopper passage while at the same time permitting the free escape of air. The construction illustrated has been found to be particularly advantageous. As shown more clearly in Fig. 2 stopper assembly 11 is composed of an inner sleeve member 19 received within an outer sleeve member 20 and secured thereto to provide an annular passage 21 for the escape of air. Outer sleeve 20 is secured in spaced relation to inner sleeve 19 by means of lower spacer member 22 which provides a plurality of radial ribs 22a which extend into engagement with the inner wall of outer sleeve 20, as illustrated more clearly in Fig. 4. There is also provided an upper spacer 23 which as shown more clearly in Fig. 3 consists of an outer ring 23a and an inner ring 23b joined by a plurality of spaced ribs 23c. Inner sleeve 19 is received within and rigidly secured to inner ring 23b of spacer 23. Preferably conduit 10 is slidably received within inner sleeve 19. This permits longitudinal adjustments of jet head 12 with respect to stopper assembly 11. Tapered resilient rubber stopper 17 is disposed about outer sleeve 20 with its top in abutting relation with the underside of ring portion 23a of spacer 23.

Deflector 18 is preferably of concavo-convex configuration and diverges downwardly in the manner illustrated in Figs. 1 and 2 of the drawing. This construction has been found particularly effective in confining the water and soil within the jar while permitting the air to escape. Preferably deflector 18 is disposed about and rigidly secured to tube 10 and arranged so that it will normally be just below the lower end of annular passage 21. The desired relationship is illustrated in Figs. 1 and 2 of the drawing.

The upper end portion of tube 10 normally projects upwardly beyond stopper assembly 11 which is preferably provided with means for connecting it to a source of compressed air or other compressed gas. In the illustration given the upper end of tube 10 is threadedly connected to T coupling 24 which in turn is threadedly connected to air hose 25 and pressure gauge 26. It will be understood that somewhere in line 25 there is preferably interposed a needle valve or other type of control valve, which will permit the pressure delivered to conduit 10 to be precisely regulated.

*Operation*

While the soil dispersion apparatus just described can be employed in a number of different ways, the following procedure is preferred:

The dry soil sample is introduced into hydrometer jar A and an adequate amount of distilled water is added to completely soak the sample. After the sample has been soaked for a sufficient time, a deflocculating agent and distilled water is added to the soaked sample to increase the resulting soil-water mixture to the desired volume. (A deflocculating agent is a chemical which will prevent the massing of soil particles suspended in water.) The soil dispersion tube B is then inserted into the hydrometer jar and rubber stopper 11 is firmly seated in the mouth of the jar. Conduit 10 is adjusted with respect to closure assembly 11 so that jet head 12 is in the position illustrated in Fig. 1, that is, so that the lower end of arm 16 is just touching the bottom of the hydrometer jar. If desired, a slight amount of air pressure can be turned on (say 1 lb. per sq. inch) before the introduction of the dispersion tube into the jar to prevent the soil and water mixture from entering into passages 14, etc. The compressed air supply is then adjusted to deliver air at a moderate pressure, and the soil-water mixture is agitated for a definite period of time by means of the plurality of jets issuing from jet head 12. By a moderate pressure is meant pressures of the order of 10 to 25 lbs. per sq. inch, since it is found that pressures in this range give an excellent dispersing action without producing degradation. It is thought that applicants jet head construction is particularly adapted to the use of sufficiently high pressures to achieve a rapid dispersion while at the same time minimizing the attrition of the particles. While the specific time required for a complete dispersion may vary somewhat with the type of soil, it has been found to be of the order of 1 to 5 minutes. Following the dispersal the soil sample, which can be diluted by adding more distilled water, is then ready for hydrometer tests in particle size determination.

It will be apparent from the above description of the preferred method of using the soil dispersion apparatus of this invention that one of its principal advantages is that the sample remains in the hydrometer jar throughout the analysis. Further specific advantages of the construction shown and described are that the position of the jet head is regulated to give proper and consistent dispersing effects, while the established orientation of the jet passages effectively prevents the soil particles from settling down at the bottom of the hydrometer jar. Other important advantages have already been dissussed above. Another advantage is that the dispersion apparatus is adapted for use in either single or multiple units.

While in the foregoing specification a specific embodiment of this invention has been set out in detail for purpose of illustration, it will be apparent to those skilled in the art that many of the details set forth can be varied widely without departing from the spirit of the invention.

We claim:

1. A soil dispersion apparatus, comprising an open-topped vertically-extending hydrometer jar, said jar having transparent walls so that the contents thereof can be observed, a removable stopper in the top of said jar, an air supply conduit extending through said stopper into said jar to a point adjacent the bottom thereof, the lower portion of said air supply conduit being equipped with at least one passage communicating with the exterior of said conduit and arranged to direct a jet of air outwardly therefrom, said stopper having at least one passage therethrough for the escape of gas, and a deflector associated with said stopper and arranged to retard the movement of liquid and solid material through said stopper passage while at the same time permitting the free escape of gas, said stopper, conduit and deflector being removable as a unit from said jar.

2. A soil dispersion apparatus, comprising an open-topped vertically-extending hydrometer jar, a removable stopper in the top of said jar, an air supply conduit extending through said stopper into said jar to a point adjacent the bottom thereof, a hollow jet head connected to the bottom of said conduit equipped with a plurality of laterally-extending arms and at least one downwardly-extending arm arranged to maintain said head in spaced relation to the side and bottom walls of said jar, said head having a plurality of downwardly and outwardly oriented passages disposed in spaced relation about said head for directing spaced air jets into said jar.

3. The soil dispersion apparatus of claim 2 which is characterized by the further fact that said air supply conduit is slidable with respect to said stopper to permit longitudinal adjustments of said jet head with respect to said stopper.

4. A soil dispersion tube adapted to be inserted into a hydrometer jar, comprising an air supply conduit having its lower end portion equipped with a plurality of passages communicating with the exterior of said conduit and arranged to direct a plurality of spaced jets of air outwardly and downwardly from said conduit, a stopper assembly disposed about the upper end portion of said gas supply conduit, said stopper assembly including an inner sleeve secured within and in spaced relation to an outer sleeve to provide an annular passage between said sleeves, the inner sleeve being slidably received on the upper end portion of said air supply conduit, and a resilient stopper disposed about said outer sleeve, and a downwardly diverging, concavo-convex shield carried by said air supply conduit just below the lower end of said annular passage.

5. In a soil dispersion apparatus adapted to be bodily inserted into a container containing a mixture of soil and water, the combination of a compressed gas supply conduit for insertion into said container to a point below the surface of said soil and water mixture, and a hollow jet head connected to the lower end of said tube and arranged for immersion in said mixture, said head having a plurality of downwardly and outwardly oriented passages disposed in spaced relation about said head in such a way as to create a downwardly diverging funnel-shaped pattern of air jets for dispersing said soil within said water, said head also being provided with a plurality of projecting arms arranged to maintain said head in spaced relation to the side and bottom walls of said container.

6. In a soil dispersion apparatus adapted to be bodily inserted into a container containing a mixture of soil and water, the combination of a compressed gas supply conduit for insertion into said container to a point below the surface of said soil and water mixture, and a hollow jet connected to the lower end of said tube and arranged for immersion in said mixture, said head having imperforate side walls and a bottom wall equipped with a plurality of downwardly and outwardly oriented passages disposed in spaced relation therein in such a way to create a downwardly diverging funnel-shaped pattern of air jets for dispersing said soil within said water, said head also being provided with a plurality of arms projecting toward the walls of said container.

References Cited in the file of this patent

UNITED STATES PATENTS

| | | |
|---|---|---|
| 1,214,372 | Romberger | Jan. 30, 1917 |
| 1,584,412 | Ward | May 11, 1926 |
| 2,221,472 | Ennis | Nov. 12, 1940 |
| 2,402,132 | Goldberg | June 18, 1946 |
| 2,521,334 | Boerstra | Sept. 5, 1950 |
| 2,626,138 | Stevens | Jan. 20, 1953 |

FOREIGN PATENTS

| | | |
|---|---|---|
| 611,482 | Great Britain | Oct. 29, 1948 |